United States Patent Office

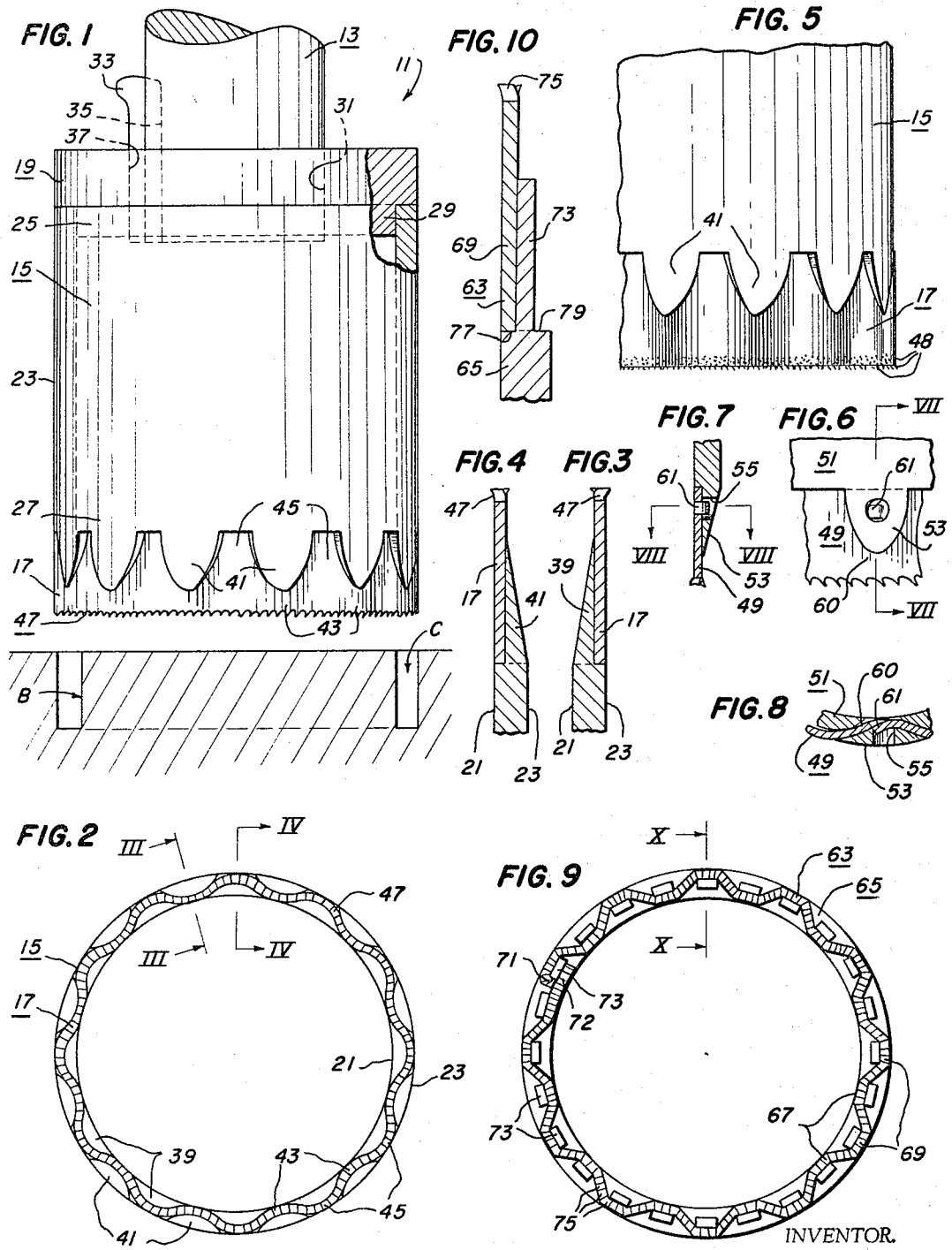

3,382,743
Patented May 14, 1968

3,382,743
DRILLING MACHINE BIT MEANS
Walter E. Trevathan, McKenzie, Tenn., assignor to Walter
Trevathan Corporation, a corporation of Tennessee
Filed Dec. 8, 1965, Ser. No. 512,482
10 Claims. (Cl. 77—69)

ABSTRACT OF THE DISCLOSURE

A bit means for forming a circular cut in a piece of work material. The bit means has an elongated rotatable tubular body having a plurality of support lugs at the lower end thereof. A thin band-like cutting ring is sinuously disposed in frictional engagement with the support lugs. Optional holding means is shown which is in the form of at least one tab formed on the cutting ring and extending into a hole in one of the support lugs. The cutting ring is shown both in a continuous form and in a non-continuous form with the ends overlapping.

---

This invention relates to bit means for use in a drilling machine or the like and to various size bit means for removable attachment to the rotating drive spindle means of the drilling machine.

An object of the present invention is to provide bit means particularly useful for cutting substantially large holes or core portions in such material as wood, metal or stone.

A further object is to provide bit means useful for forming a circular or scallop-shaped cut on an end portion of a length of rod or tube stock, as for joining that cut end to the cylindrical lateral surface of another rod or tube.

A further object is to provide bit means including a readily replaceable cutting ring for engaging and cutting the work material.

A further object is to provide a cutting ring substantially cheap to manufacture and a disposable ring which may be discarded when it becomes worn.

A further object is to provide a cutting ring having undulations extending circumferentially about the distal or cutting end of the cutting ring.

A further object is to provide a cutting ring having a circumferential undulated form for effectively removing the chips cut from the work material.

A further object is to provide a circumferential undulated row of cutting elements for forming a smooth rapid cut in the work material.

A further object is to provide a sturdy bit which will not deform out of round as the cut is being made and a bit which will make a true cylindrical or circular cut in the work material.

The means by which the foregoing and other objects of the present invention are accomplished and the manner of their accomplishment will be readily understood upon reference to the accompanying drawings, in which:

FIG. 1 is an elevational view of the preferred embodiment of the bit means of the present invention illustrating the bit means attached to the drive spindle means of a drilling machine (fragmentarily shown) and the bit means as acting on a piece of work material.

FIG. 2 is an end view of the bit means as viewed upwardly in FIG. 1 toward the cutting end of the bit means.

FIG. 3 is a fragmentary sectional view taken as on the line III—III of FIG. 2.

FIG. 4 is a fragmentary sectional view taken as on the line IV—IV of FIG. 2.

FIG. 5 is a fragmentary elevational view of a modified embodiment of the present invention.

FIG. 6 is a fragmentary elevational view of another embodiment.

FIG. 7 is a fragmentary sectional view taken as on the line VII—VII of FIGURE 6.

FIG. 8 is a fragmentary sectional view taken as on the line VIII—VIII of FIG. 7.

FIG. 9 is an end view similar to FIG. 2, of another embodiment of the bit means of the present invention.

FIG. 10 is a fragmentary sectional view taken as on the line X—X of FIG. 9.

The preferred form of the bit means illustrated in FIGS. 1–4 inclusive will first be described. The bit means, indicated by numeral 11, is adapted to be removably attached to the drive spindle 13 of a drilling machine (not shown). Bit means 11 includes basically a tubular body 15, a cutting ring 17, and an annular attachment member 19. The wall of tubular body 15 is defined substantially by an inside cylindrical surface 21, an outside cylindrical surface 23, and proximal and distal end portions 25, 27 respectively. The upper circular proximal end portion 25 of tubular body 15 is securely fitted in a recessed portion 29 in the underside of annular attachment member 19. Annular member 19 and body 15 preferably are fixedly secured together as by brazing or welding. The axial bore opening of annular attachment member 19 is substantially defined by an inside cylindrical surface 31. Annular member 19 is snugly fitted to spindle 13 with inside cylindrical surface 31 fixedly engaging the outside cylindrical surface of spindle 13. A key member 33 fitted respectively in key slots 35, 37 respectively of spindle member 13 and attachment member 19 securely attach tubular body 15 to drive spindle 13.

Tubular body 15 includes a plurality of spaced circumferentially extending equiangularly arranged support lugs 39, 41 projecting respectively longitudinally from distal end portion 27. Support lugs 39, 41 are in circumferential staggered arrangement and with adjacent lugs 39, 41 being staggered respectively inwardly and outwardly relative to the wall thickness of the tubular body. Support lugs 39 are equiangularly arranged around the interior of tubular body 15; support lugs 41 are equiangularly arranged around the exterior of the tubular body. Support lugs 39, 41 are each substantially alike and somewhat crescent-shaped in cross section. Preferably each support lug 39, 41 is tapered from the root or base portions thereof to the tip end or tip edge portion.

Cutting ring 17 is circumferentially integrally formed and is preferably, though not necessarily, of uninterrupted continuous form. Cutting ring 17 is of substantially uniform thickness and is in the form of a series of circumferentially extending undulations. Cutting ring 17 is formed in an alternately arranged series of inwardly and outwardly disposed arcuate portions 43, 45 respectively. Cutting ring 17 is detachably engaged with tubular body 15; the proximal edge portion of cutting ring 17 is frictionally engaged with support lugs 39, 41. Adjacent arcuate portions 43, 45 of cutting ring 17 respectively are frictionally engaged with adjacent support lugs 39, 41.

The distal edge portion of cutting ring 17 includes a multiplicity of cutting elements or teeth 47 arranged in a circumferentially extending row. Teeth 47 are formed of the distal edge portions of arcuate portions 43, 45 of cutting ring 17 and the teeth are in circumferentially extending undulated arrangement. Adjacent and alternate teeth of row of teeth 47 are preferably inwardly and outwardly bent or set (see FIGS. 3 and 4).

FIG. 5 illustrates a modification of the embodiment illustrated in FIGS. 1–4 inclusive. The distal edge portion of cutting ring 17 is provided with a multiplicity of abrasive crystals 48 bonded to and extending in a circumferential undulated row around the distal or cutting edge portion of the cutting ring. This embodiment is particularly adapted for high speed cutting.

FIGS. 6, 7 and 8 illustrate another embodiment of the present invention. In this embodiment holding means is provided for additionally securing the cutting ring to the tubular body. The cutting ring and tubular body are indicated respectively 49, 51 in FIGS. 6, 7 and 8. Preferably both the inward and outward support lugs, which correspond to lugs 39, 41, are provided with holding means in connection therewith. However, since the holding means are substantially identical relative to the inward and outward lugs, the following description of the holding means in connection with one of outward support lugs 53 should suffice for all. Each outward support lug 53 of body 51 includes structure defining a radially extending bore opening 55 in the root portion of each lug 53. Each portion of the inwardly disposed arcuate portions 60 of cutting ring 49 includes a tab portion 61. Each tab portion 61 extends longitudinally and projects generally radially or laterally outwardly from each arcuate portion 60. The distal or free end of each tab portion 61 preferably extends in a direction opposite the rotation of the bit means. It will be understood that the tab portions, not shown, in connection with the inward lugs, not shown, are identical to tab portions 61 except they extend laterally inwardly rather than outwardly.

FIGS. 9 and 10 illustrate another embodiment of the invention with the cutting ring and tubular body indicated 63 and 65 respectively. Ring 63 includes inwardly and outwardly disposed arcuate portions 67, 69 respectively. Cutting ring 63 is preferably a split ring and includes an end portion 71 hooked over one of support lugs 73 and another end portion 72 which extends substantially straight alongside of said one of support lugs 73 to allow for expansion or retraction of the cutting ring 63. It will be understood that this hooked arrangement of end portion 71 is in such a direction that counterclockwise rotation of tubular body 65, as viewed in FIG. 9, will keep the cutting ring 63 properly held. It will be understood that if clockwise rotation were desired, the end portion 72 would be hooked and the portion 71 straight. It will be understood that if desired cutting ring 63 may be one continuous ring rather than being split, and by the same token ring 17 may be a split ring rather than being continuous, without departing from the spirit and scope of the present invention. Support lugs 73 of tubular body 65 are each alike and are each symmetrically arranged relative to the wall thickness of body 65. Support lugs 73 are respectively uniformly spaced and in substantially cylindrical configuration. Cutting ring 63 is preferably provided with a circumferentially extending row of teeth 75 corresponding substantially with teeth 47 of the first-described embodiment. Inwardly and outwardly disposed arcuate portions 67, 69 engage respectively opposite side surfaces of adjacent support lugs 73 and frictionally secure cutting ring 63 to tubular body 65. The proximal edge surface 77 of cutting ring 63 parallel abuttingly engages the distal edge surface 79 of tubular body 65 (see FIG. 10). It will be understood that the holding means for holding the cutting ring to the lugs in the embodiment shown in FIGS. 6–8 may be used with the embodiments shown in FIG. 5 and FIG. 9 without departing from the spirit and scope of the present invention.

FIG. 1 illustrates a circular cut indicated C, formed in a work piece of material. It may be desirable in certain applications to use the bit means for removing core portions from the parent material as core portion indicated B in FIG. 1.

When the teeth or cutting elements of the cutting ring of the bit means become worn, the operator may, with the use of a hammer and chisel, readily disengage the cutting ring from the tubular body. The operator, by placing the edge of the chisel in engagement with the proximal edge surface (as edge surface 77) of the cutting ring may strike the chisel with a hammer and quickly disengage the ring from the support lugs of the body. To install a cutting ring on the body, the operator has only to press or drive the cutting ring onto the support lugs.

Although the present invention has been described in some detail and by way of example and for purposes of clarity and understanding, it is to be understood that it is not to be so limited since changes and modifications may be made therein which are within the full intended scope of the invention as hereinafter claimed.

I claim:

1. In a drilling machine or the like having rotatable drive spindle means; bit means for forming a circular cut in a piece of work material comprising an elongated tubular body having wall thickness defined substantially by inside and outside concentric cylindrical surfaces and having proximal and distal end portions and a plurality of circumferential equiangularly arranged support lugs projecting respectively longitudinally from said distal end portion; means securely attaching said proximal end portion of said body to said drive spindle means of said drilling machine; a thin band-like metal cutting ring of substantially uniform thickness having circumferentially extending proximal and distal edge portions, said cutting ring being in the form of circumferentially extending uniform undulations including inwardly and outwardly alternatingly arranged arcuate portions, said cutting ring being substantially thinner than said wall thickness of said tubular body and being non-rigid, said proximal portion of said cutting ring being detachably frictionally and non-integrally engaged with said support lugs with adjacent arcuate portions respectively of said inwardly and outwardly alternatingly arranged arcuate portions of said cutting ring being arranged respectively inwardly and outwardly of adjacent support lugs of said plurality of circumferential equiangularly arranged support lugs; and cutting means including a multiplicity of cutting elements substantially integrally secured to said distal edge portion of said cutting ring for cutting the work material.

2. The bit means of claim 1 further characterized in that said plurality of support lugs projecting longitudinally from said distal end portion of said tubular body are in circumferential staggered arrangement and with adjacent support lugs being staggered respectively inwardly and outwardly relative to the wall thickness of said tubular body.

3. The bit means of claim 1 further characterized in that said plurality of support lugs projecting longitudinally from said distal end portion of said tubular body are symmetrically arranged relative to the wall thickness of said tubular body and are arranged substantially in uniformly spaced cylindrical configuration.

4. The bit means of claim 1 further characterized in that said cutting ring is circumferentially integral and of uninterrupted continuous undulated form.

5. In a drilling machine or the like having rotatable drive spindle means; bit means for forming a circular cut in a piece of work material comprising an elongated tubular body having wall thickness defined substantially by inside and outside concentric cylindrical surfaces and having proximal and distal end portions and a plurality of circumferential equiangularly arranged support lugs projecting respectively longitudinally from said distal end portion; means securely attaching said proximal end portion of said body to said drive spindle means of said drilling machine; a band-like cutting ring of substantially uniform thickness having circumferentially extending proximal and distal edge portions, said cutting ring being in the form of circumferentially extending uniform undulations including inwardly and outwardly alternatingly arranged arcuate portions, said proximal portion of said cutting ring being detachably frictionally engaged with said support lugs with adjacent arcuate portions respectively of said inwardly and outwardly alternatingly arranged arcuate portions of said cutting ring being arranged respectively inwardly and outwardly of adjacent support lugs of said plurality of circumferential equiangularly arranged support lugs; and cutting means including a multiplicity of cutting elements substantially integrally secured to said distal edge portion of said cutting ring for cutting the work material, said circumferential cutting ring including a pair of end portions in overlapping relationship and with one of said end portions being fixedly held relative to said tubular body and the other of said end portions being free for expansion and retraction movements.

6. The bit means of claim 1 further characterized in that said cutting elements of said cutting means is in the form of a multiplicity of serrations defining substantially a continuous row of teeth in circumferentially extending undulated arrangement.

7. The bit means of claim 1 further characterized in that said cutting elements of said cutting means is in the form of a multiplicity of abrasive crystals bonded to said distal edge portion of said cutting ring and defining substantially a continuous row of abrasive elements in circumferentially extending undulated arrangement.

8. In a drilling machine or the like having rotatable drive spindle means, bit means for forming a circular cut in a piece of work material comprising an elongated tubular body having wall thickness defined substantially by inside and outside concentric cylindrical surfaces and having proximal and distal end portions and a plurality of circumferential equiangularly arranged support lugs projecting respectively longitudinally from said distal end portion; means securely attaching said proximal end portion of said tubular body to said drive spindle means of said drilling machine; a thin band-like metal cutting ring of substantially uniform thickness having circumferentially extending proximal and distal end portions, said cutting ring being in the form of circumferentially extending uniform undulations including inwardly and outwardly alternatingly arranged arcuate portions; freely detachable holding means coactingly operable between at least one support lug of said tubular body and at least one arcuate portion of said inwardly and outwardly arranged arcuate portions of said cutting ring for non-integrally removably holding said cutting ring to said body with adjacent arcuate portions respectively of said inwardly and outwardly alternatingly arranged arcuate portions of said cutting ring being arranged respectively inwardly and outwardly of adjacent support lugs of said plurality of circumferential equiangularly arranged support lugs; and cutting means including a multiplicity of cutting elements substantially integrally secured to said distal edge portion of said cutting ring for cutting the work material.

9. The bit means of claim 1 in which said support lugs are disposed entirely within the space defined by an imaginary extension of said inside and outside cylindrical surfaces.

10. In a drilling machine or the like having rotatable drive spindle means, bit means for forming a circular cut in a piece of work material comprising an elongated tubular body having wall thickness defined substantially by inside and outside concentric cylindrical surfaces and having proximal and distal end portions and a plurality of circumferential equiangularly arranged support lugs projecting respectively longitudinally from said distal end portion; means securely attaching said proximal end portion of said tubular body to said drive spindle means of said drilling machine; a band-like cutting ring of substantially uniform thickness having circumferentially extending proximal and distal end portions, said cutting ring being in the form of circumferentially extending uniform undulations including inwardly and outwardly alternatingly arranged arcuate portions; holding means coactingly operable between at least one support lug of said tubular body and at least one arcuate portion of said inwardly and outwardly arranged arcuate portions of said cutting ring for removably holding said cutting ring to said body with adjacent arcuate portions respectively of said inwardly and outwardly alternatingly arranged arcuate portions of said cutting ring being arranged respectively inwardly and outwardly of adjacent support lugs of said plurality of circumferential equiangularly arranged support lugs; and cutting means including a multiplicity of cutting elements substantially integrally secured to said distal edge portion of said cutting ring for cutting the work material, said holding means including at least one integrally formed tab portion formed in and projecting generally radially from said cutting ring and including hole structure in at least one of said support lugs and forming a hole in said support lug, said cutting ring being removably secured to said tubular body with said tab portion received in and engaging said hole structure of said support lug.

References Cited

UNITED STATES PATENTS

| | | | |
|---|---|---|---|
| 1,829,659 | 10/1931 | Kefflo | 143—85.1 |
| 2,811,960 | 11/1957 | Fessel | 77—69 XR |

FRANCIS S. HUSAR, *Primary Examiner.*